June 1, 1948.  H. E. MALONE ET AL  2,442,367
METERING VALVE CONTROL

Filed April 26, 1943  2 Sheets-Sheet 1

INVENTORS
HOMER F. MALONE
CLARENCE H. TRAVER
BY Tate and Harris ATTORNEYS

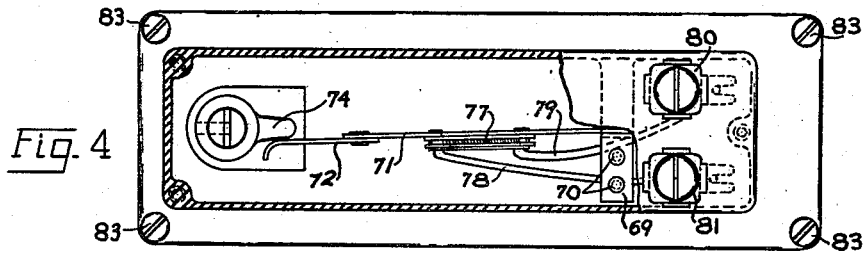
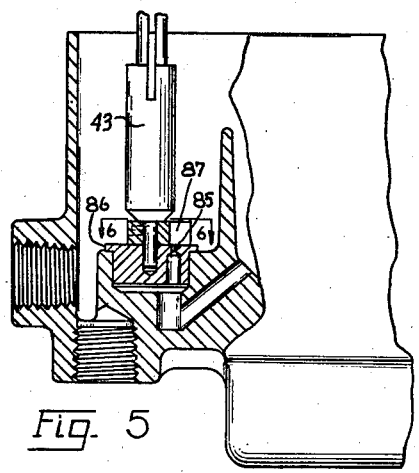
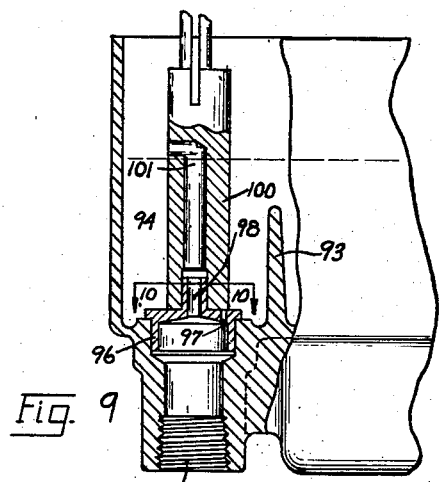
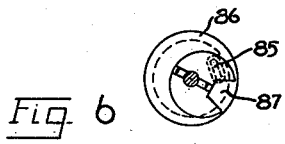
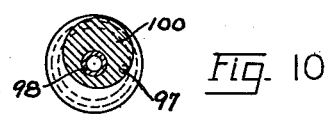
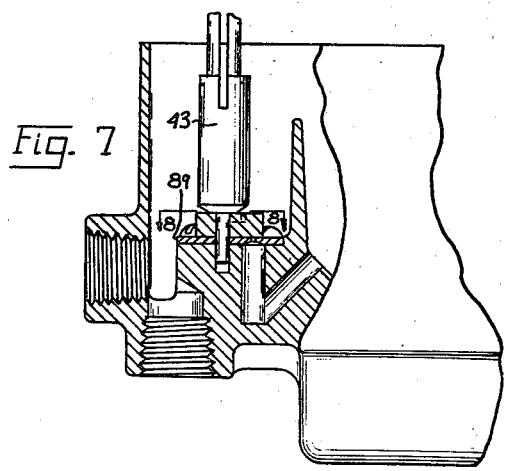
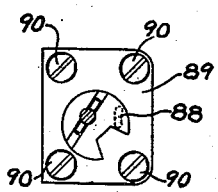
INVENTORS
HOMER E. MALONE
CLARENCE H. TRAVER
BY Jats and Harris ATTORNEYS Patented June 1, 1948

2,442,367

UNITED STATES PATENT OFFICE 2,442,367

METERING VALVE CONTROL

Homer E. Malone and Clarence H. Traver, Milwaukee, Wis., assignors to Perfex Corporation, Milwaukee, Wis., a corporation of Wisconsin Application April 26, 1943, Serial No. 484,536

4 Claims. (Cl. 137—21)

This invention relates in general to control devices and more particularly to devices for controlling the flow of oil to vaporization type oil burners. In devices of this type it is customary to provide a constant level chamber in which a constant oil level is maintained by a float controlled inlet valve. From this chamber the oil is passed through a metering valve from which it flows to the burner. In burners of the character mentioned it is usually desirable to maintain a small pilot flame during times when heat is not required in order to make relighting of the burner unnecessary. The oil metering valve must therefore be capable of accurately metering the oil to the burner from a relatively large flow which provides "high fire" in the burner, down to a very minute flow for providing pilot flame. In the past, metering valves of this class have consisted of a hollow stem valve member which slides within a valve port, the metering being achieved by varying the length of a restricted annular passage between the valve member and port by raising or lowering the valve member. While this type of metering valve has been satisfactory, it requires manufacture of the valve member and seat within very close tolerances to obtain satisfactory and consistent results.

It is an object of this invention to provide a metering valve construction which is simple and positive in operation and easy to manufacture.

In the present invention this object is achieved by the use of a rotary valve member which covers a valve port between the constant level chamber and outlet chamber of a float valve, rotation of the valve member varying the amount of the valve port covered and hence varying the flow.

A further object of the invention is the provision of a novel rotary actuating means for a metering valve.

Another object of the invention is the provision of a rotary type metering valve control arranged to be actuated by a thermostatic actuator carried by a removable cover for the float valve casing, this actuating means providing for removal of the cover and thermostatic actuator as a unit.

Other objects of the invention will become apparent as this description proceeds.

For a full disclosure of the invention, reference is made to the following detailed description and to the accompanying drawings in which Fig. 1 is an elevation, partly in section, of a complete float valve embodying the novel metering valve control of this invention;

Fig. 4 is a top view partly broken away to show the thermostatic actuator mechanism;

Fig. 5 is a fragmentary view similar to Fig. 1 but showing a modification;

Fig. 6 is a view of the metering valve assembly taken on line 6—6 of Fig. 5;

Fig. 7 is a fragmentary sectional elevation showing another form of the invention;

Fig. 8 is a section taken on line 8—8 of Fig. 7;

Fig. 9 is a sectional elevation of another modification; and

Fig. 10 is a section taken on line 10—10 of Fig. 9.

Figure 1:
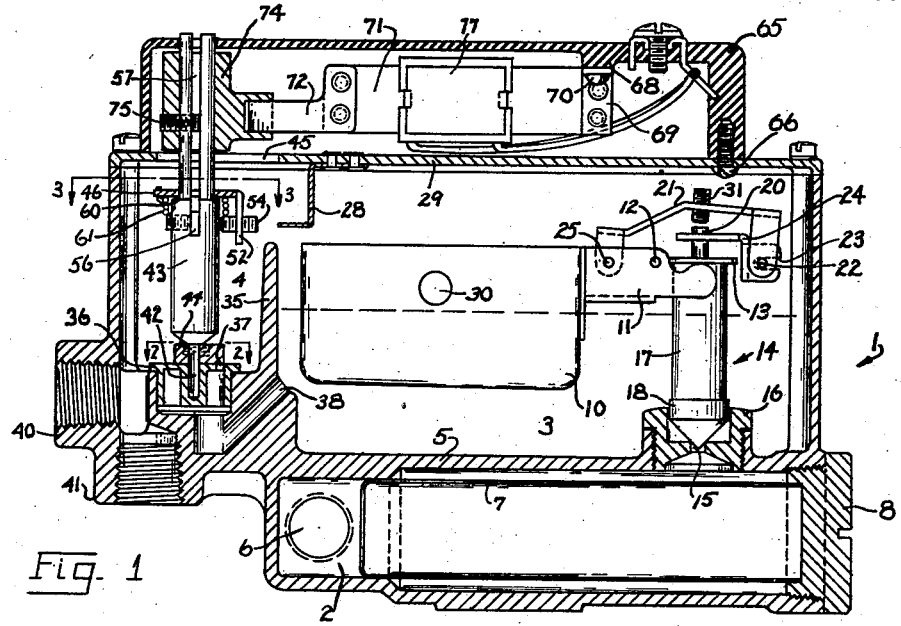

Referring to Fig. 1, reference character 1 indicates generally a float valve casing having a filter chamber 2, a float chamber 3, and an outlet chamber 4. The filter chamber 2 and float chamber 3 are separated by a horizontal partition 5. The filter chamber is provided with an oil inlet 6 and contains an elongated filter 7 of usual construction, this filter being received in a plug 8 which closes the open end of this chamber.

The float or constant lever chamber 3 contains an open float 10 attached to a float lever 11 which rocks on a fixed pivot 12 which extends from side to side of the float chamber. The right hand end of the float lever extends under a flange 13 on a valve member assembly 14 which cooperates with an inlet valve port 15 formed in a valve fitting 16. This valve member assembly consists of an outer sleeve 17 which is held in fixed but yieldable relationship with a valve member 18 by means of a strain release spring located inside the sleeve. The valve member 18 is rigidly attached to a valve stem 20 which extends through and beyond the end of the sleeve 17. This valve stem is arranged for direct actuation by a safety shut-off lever 21 which is pivoted to a pin 22 which is received in a slot 23 of a bracket member 24. This bracket member extends from side to side of the casing and is provided with a portion through which the valve stem 20 extends, this serving as a guide for the upper end of the valve member. The free end of the safety lever 21 is attached by a pivot pin 25 carried by the float lever 11. The float 10 serves to position the valve member assembly 14 so as to maintain a substantially constant oil level in the float chamber 3. Thus if the level begins falling, the float 10 will lower which will raise valve 14 from its seat and increase the flow of oil into the chamber. Conversely, if the level begins rising, the float rises for permitting the valve member assembly to lower by its own weight and reduce the flow of oil into the chamber.

If the inlet valve should fail to hold properly, the oil level in chamber 3 will begin rising, which will cause the float to rise against a stop 28 which is attached to cover plate 29 of the float valve casing. Further rise in oil level will cause the oil to overflow through an opening 30 into the float, thereby causing the float to sink in the oil. Initial sinking movement of the float will rise the valve member assembly 14 from its seat for providing maximum flow to flush off the valve surfaces. As the float continues to sink the safety lever 21 will be moved downwardly, causing the screw 31 to abut against the valve stem 20 and force the valve closed. The valve will now remain closed until the float is emptied. This is done by removing the cover 29 and pivot pin 12, this permitting the float and levers to be removed from the casing so that the float may be emptied.

The above described float controlled inlet valve is described in greater detail and is claimed in the co-pending application of Homer E. Malone, Serial No. 484,535, filed April 26, 1943, now Patent 2,400,560, granted May 21, 1946.

The outlet chamber 4 is separated from the float chamber by means of a partition 35. Pressed into the float valve casting is a metering valve port insert 36, which is formed with a metering valve port 37. Oil flows from the float chamber 3 through a passage 38, through the valve port 37 into the outlet chamber 4, from which it flows either through an outlet 40 or an outlet 41 to the burner.

The valve insert is formed with a central opening which receives a reduced extension 42 of a metering valve stem or shaft 43. Loosely mounted on the shaft portion 42 is a valve member 44 which is arranged to cover or uncover the valve port 37 upon rotation of the shaft 43. The shaft 43 is preferably of massive construction so that its weight serves to hold the valve member tightly against the flat face of the valve insert. It will be noted that the portion of the valve member which rests against the insert is flat or coincides with the surface of the insert. These surfaces are ground to fit each other closely so as to provide a fluid-tight seal. While it is preferable that the coinciding surfaces of the valve member and valve insert be flat, this is not necessary, and if desired the surfaces may be curved. The surfaces, however, should fit with precision so as to avoid leakage under the valve member.

The rotary valve shaft 43 extends upwardly through the outlet chamber and through an opening 45 in the cover plate 29. The upper portion of the shaft 43 is guided by means of a cross member 46 which extends from side to side of the casing and which is held in place by screws 47 and 48 (Fig. 3) which are received in bosses 49 and 50 (Fig. 2) formed on the side walls. Due to the loose or floating fit of the valve member on the shaft, the valve member will always be aligned on the valve seat due to the weight of the valve shaft. The cross or guide member 46 therefore is not required to be accurately aligned with the valve port. The valve member is caused to rotate with shaft 43 by means of a key 44a (Fig. 2) which extends through the shaft and fits into a slot 44b formed in the upper part of the valve member. The cross member 46 is provided with downwardly extending bracket portions 51 and 52 which carry stop screws 53 and 54. These stop screws cooperate with a stop member 56 which extends through the lower end of an elongated slot 57 formed in the shaft 43. The stop screw 54 cooperates with the stop member 56 in limiting counter-clockwise rotation of shaft 43 as seen in Fig. 3. An inspection of Fig. 2 will show that this limits opening movement of the valve member. The stop screw 54 thus determines the maximum amount of oil which will pass through the metering valve and thus forms a high fire adjustment for the burner. The stop screw 53 cooperates with the stop member 56 in limiting clockwise rotation of the valve shaft as seen in Fig. 3, and thus forms a low fire or pilot flame adjustment.

The valve shaft 43 is preferably provided with a shoulder 60 beneath the cross member 46, this arrangement preventing removal of the valve shaft and member without removing the cross member 46. Surrounding the valve shaft is a spiral spring 61. The upper end of the spring is anchored in the cross member 46 and the opposite end is held by the stop member 56. This arrangement biases the shaft in a clockwise direction as seen in Fig. 3, and thus normally maintains the stop member 56 in engagement with the low fire adjustment screw 53.

Located on the top of the cover plate 29 is a thermostatic element housing 65. This housing is secured to the cover plate by screws 66. The housing is formed with a boss 68, upon which is mounted an L-shaped bracket 69, screws 70 serving to hold this bracket in place. Riveted to the bracket 69 is a bimetallic strip 71. This thermostatic element lies in a substantially vertical plane and extends generally horizontally across the top of the casing. The free end of the element 71 is secured to an actuating member 72 which is arranged for engagement with a crank arm 74. This crank arm is secured to the upper portion of the valve shaft by means of a set screw 75 which is threaded into the left hand part of the split section and which abuts the right hand part thereof. It will be apparent that this set screw spreads apart the two parts of the split section and thus holds the crank arm 74 tightly. The bimetallic element 71 is provided with an electric heating element 77. This element is connected by leads 78 and 79 to terminals 80 and 81 secured to the upper surface of the housing 65. When the electric heating element 77 is deenergized the bimetallic element 71 warps counter-clockwise, as seen in Fig. 4, which permits clockwise rotation of the valve shaft 53 by the spring 61 until the stop member 56 engages the low fire adjustment screw 53. Thus when the electric heater is deenergized the bimetallic element 71 permits rotation of the valve member against its low fire adjustment for providing an oil flow just sufficient to maintain a pilot flame in the burner. When the electric heater is energized, the element 77 warps clockwise as seen in Fig. 4, this causing counter-clockwise rotation of the shaft 43 against the action of the spring 61 until the stop member 56 comes into engagement with the high fire adjusting screw 54. Energization of the electric heater therefore increases the oil supply to the burner so as to operate the burner at high flame.

It will be observed that by removing the screws 83, which hold the cover plate 29 in place, the cover plate, housing and bimetallic element may be removed as a unit. This removal is permitted by the opening 45 in the cover plate which clears the crank arm 74. Due to the arrangement in which the member 72 merely abuts the crank arm 74, there is no connection between these elements to take apart, and consequently the entire cover assembly is readily removable for re-setting the inlet valve mechanism.

It should be noted that the metering valve assembly may be assembled as a unit and then inserted in place within the outlet chamber 4. This arrangement also may be readily removed for any necessary attention by removing the screws 47 and 48 which hold the cross member 46 in place.

Figure 2:
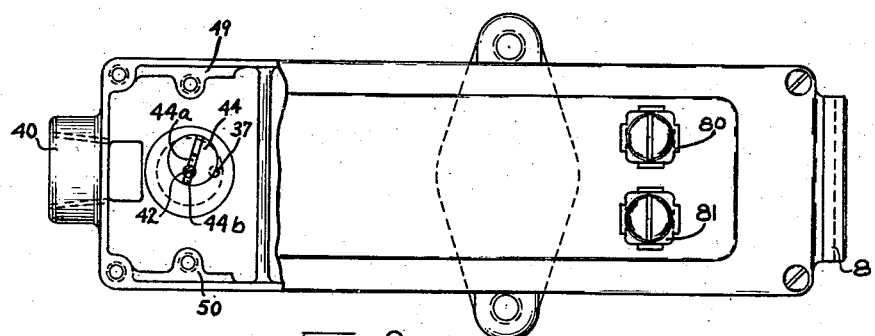
Fig. 2 is a top view of Fig. 1 with a portion of the cover and metering valve broken away to show the metering valve construction on line 2—2 of Fig. 1.
Figure 3:
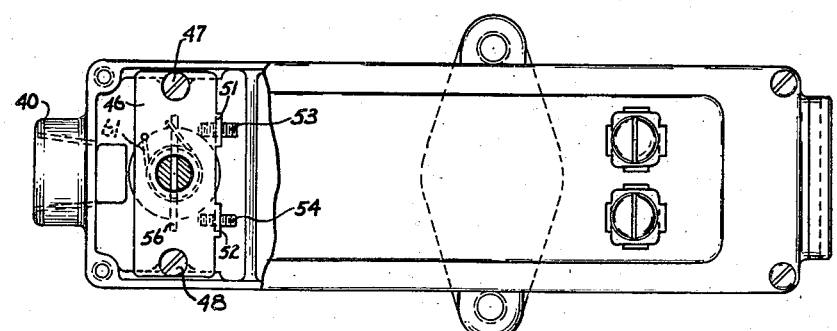
Fig. 3 is a view similar to Fig. 2 but taken on line 3—3 of Fig. 1.

In Figs. 1 and 2 the metering valve member is shown as being circular in shape and eccentrically mounted on the shaft portion 42. Figs. 5 and 6 show a modified form. In these figures the valve port consists of an elongated slot 85 formed in the insert 86. The valve member, instead of being fully circular, is cut away at 87, this cut-away portion serving to uncover the valve port as the valve member is rotated in a counter-clockwise direction.

Figs. 7 and 8 show the same type of valve member as shown in Figs. 5 and 6. However in this embodiment of the invention the elongated valve port 88 is formed in a flat plate 89 which is secured to the valve body by screws 90. This makes the plate 89 readily removable and permits plates having different sizes of valve ports to be substituted so as to obtain whatever rating desired.

In the embodiments of the invention thus far described the oil flows upwardly through the valve port into the outlet chamber. The invention is also applicable to arrangements in which the oil flows downwardly from the float chamber into the oil line leading to the burner. One embodiment of this type is shown in Figs. 9 and 10. In this figure the dam 93 does not extend above the normal oil level, and thus oil from the float chamber flows directly into the chamber 94. This chamber 94 is separated from an outlet passage 95 by means of a metering valve insert 96 which is provided with a metering valve port 97. The metering valve insert is also provided with a hollow upwardly extending cylindrical projection 98. This projection serves as a pivot for an eccentric valve member 100. This valve member is provided with a vent passage 101 which opens through the side of the member above the oil level. This arrangement permits air in the oil line to the burner to pass upwardly to atmosphere, and thus avoids airbinding of the oil line. The valve member 100 may be actuated in the same manner as in the embodiments of the invention previously described.

While the valve stem is preferably actuated by the bimetallic element 71 for providing automatic control, the invention is not limited to an actuator of this type. In many cases it will be desirable to omit the thermostatic actuator and to substitute a manually adjustable handle or knob in place of the crank arm 74.

From the foregoing description it will be apparent that the present invention provides a simple and dependable metering valve mechanism which will accurately meter the flow of oil to a burner. It will also be apparent that this invention provides for automatic control and at the same time renders the float valve cover easily removable so that the valve mechanism may be adjusted or re-set. It will further be apparent that the invention provides for quick assembling or disassembling of the metering valve mechanism. While several embodiments of the invention have been illustrated, other modifications which are within the scope of the invention will be obvious to those skilled in the art. It is therefore desired to be limited only by the scope of the appended claims.

What is claimed is:

1. In a control device for metering the flow of oil to a burner, a casing providing a constant level chamber and an outlet chamber, means including a horizontal partition located beneath the normal oil level for separating the constant level chamber from the outlet chamber, said partition being formed to provide a metering valve port, a metering valve member cooperating with said port, a rotatable metering valve shaft extending upwardly through the casing, a cross member extending across the upper portion of the casing and having a guide opening through which the shaft extends, a stop element projecting laterally from the shaft, a stop element carried by said cross member for cooperating with said first mentioned stop element in limiting rotation of said shaft, and a spring surrounding the valve stem for biasing rotation of said shaft in one direction, one end of the spring being attached to the shaft and the other end being attached to said cross member.

2. In a control device for metering the flow of oil to a burner, a casing providing a constant level chamber and an outlet chamber, means including a horizontal partition located beneath the normal oil level for separating the constant level chamber from the outlet chamber, said partition being formed to provide a metering valve port, a metering valve member cooperating with said port, a rotatable metering valve shaft extending upwardly through the casing, a cross member extending across the upper portion of the casing and having a guide opening through which the shaft extends, a spring surrounding the valve stem for biasing rotation of said shaft in one direction, one end of the spring being attached to the shaft and the other end being attached to said cross member, and stop means for limiting rotation of the shaft by said spring.

3. In a control device for metering the flow of oil to a burner, a casing providing a constant level chamber and an outlet chamber, a removable cover for said casing, means including a horizontal partition located beneath the normal oil level for separating the constant level chamber from the outlet chamber, said partition being formed to provide a metering valve port, a metering valve member cooperating with said port, a rotatable metering valve shaft extending upwardly through the casing, a spring for biasing rotation of said shaft in one direction, stop means for limiting rotation of said shaft by said spring, a crank arm on the shaft, an elongated thermostatic strip mounted on the cover and removable therewith as a unit, said thermostatic strip being disposed in a generally vertical plane and extending generally horizontally across said cover and having its free end in abutting relationship with said crank so that warping of said element causes rotation of said crank, and electric heating means for said thermostatic element.

4. In a control device for metering the flow of oil to a burner, a casing providing a constant level chamber and an outlet chamber, means including a horizontal partition located beneath the normal oil level for separating the constant level chamber from the outlet chamber, said partition being formed to provide a metering port and having a precision surface adjacent said port extending generally laterally thereof, a valve member having a precision surface coinciding with the precision surface of said partition and arranged to rotate on the partition to cover and uncover the valve port, a valve actuating shaft extending upwardly through the casing for rotating the valve member, a cross member extending across the upper portion of said casing and having a guide opening through which the shaft extends, a stop element projecting laterally from both sides of the shaft adjacent the cross member, a pair of adjustable stops carried by the cross member, one stop being at one side of the shaft and limiting rotation of the shaft in one direction and the other stop being at the other side of the shaft and limiting rotation of the shaft in the opposite direction, a cover for the casing through which the shaft extends, a spring for biasing rotation of the shaft in one direction, a crank arm on the shaft, an elongated thermostatic strip mounted on the cover and removable therewith as a unit, said thermostatic strip being disposed in a generally vertical plane and extending generally horizontally across said cover and having its free end in abutting relationship with said crank so that warping of said element causes rotation of said crank, and electric heating means for said thermostatic element.

HOMER E. MALONE.
CLARENCE H. TRAVER.

REFERENCES CITED

The following references are of record in the file of this patent:

UNITED STATES PATENTS

| Number | Name | Date |
|---|---|---|
| Re. 21,549 | Hubbard | Sept 3, 1940 |
| 1,026,608 | Schorn | May 14, 1912 |
| 1,363,620 | Sellman | Dec. 28, 1920 |
| 1,471,991 | White | Oct. 23, 1923 |
| 1,797,113 | Whatmough et al. | Mar. 17, 1931 |
| 1,806,530 | Giesler | May 19, 1931 |
| 2,080,272 | Hollman | May 11, 1937 |
| 2,219,473 | Delancy | Oct. 29, 1940 |
| 2,244,088 | Stroud | June 3, 1941 |
| 2,273,205 | Kommer et al. | Feb. 17, 1942 |
| 2,279,066 | Sears | Aug. 7, 1942 |